United States Patent [19]
Khalsa

[11] Patent Number: 5,298,274
[45] Date of Patent: Mar. 29, 1994

[54] METHODS FOR MAKING TORTILLA CHIPS AND TORTILLA CHIPS PRODUCED THEREBY

[76] Inventor: Nirbhao S. Khalsa, 3141 NW. Greenbriar Ter., Portland, Oreg. 97210

[21] Appl. No.: 867,262
[22] Filed: Apr. 10, 1992
[51] Int. Cl.⁵ .................... A23L 1/10; A23L 1/185
[52] U.S. Cl. ........................... 426/560; 426/28; 426/438; 426/439; 426/808
[58] Field of Search ............ 426/28, 560, 438, 439, 426/808

[56] References Cited
U.S. PATENT DOCUMENTS

| | | | |
|---|---|---|---|
| 4,613,507 | 9/1986 | Fulger et al. | 426/28 |
| 4,756,920 | 7/1988 | Willard | 426/560 |
| 5,192,574 | 3/1993 | Hunt et al. | 426/549 |

Primary Examiner—D. Czaja
Assistant Examiner—Mary S. Mims
Attorney, Agent, or Firm—Stoel Rives Boley Jones & Grey

[57] ABSTRACT

Tortilla chips having improved flavor, sweetness and textural characteristics, as well as enhanced nutritional values, are provided using a combination of whole kernel dried corn and germinated grain such as corn to produce a masa dough. Germinated grain contributes a "sweet" flavor as a consequence of the high concentration of natural sugars in the sprouted material. The sprouted corn also contributes substantial fiber and nutritional values to tortilla chips. Specialized methods and systems for producing and processing masa dough having a germinated fraction are required as a consequence of the unique consistency and higher fiber content of the masa dough mixture.

26 Claims, 2 Drawing Sheets

METHODS FOR MAKING TORTILLA CHIPS AND TORTILLA CHIPS PRODUCED THEREBY

FIELD OF THE INVENTION

The present invention relates to methods and apparatus for preparing and processing grains to produce tortilla chips having a novel composition that provides improved flavor, texture, and nutritional benefits. The invention is especially directed to processing of whole corn to produce tortilla chips characterized by enhanced corn flavor, sweetness, texture and nutritional values.

BACKGROUND OF THE INVENTION

Numerous processed grain products, including breads, crackers, snack foods, and the like are available. Grain products comprising principally corn, including corn chips, tortilla chips, tortillas, and other snack foods have been successfully marketed. Tortilla chips are distinguished from corn chips in that tortilla chips are baked and then fried, while corn chips are fried and have a higher oil content. Tortilla chips may be produced by cooking and steeping whole kernel, raw corn in water, then grinding it to produce masa dough having a relatively high moisture content, and rolling or pressing the masa dough to form desired shapes. The processed corn is finally baked and/or fried and seasoned to provide a crunchy tortilla chip. Many commercial producers use premade masa flour and mix it with a liquid to form masa dough rather than cooking and grinding whole kernel corn to produce masa dough directly from whole grains.

Although existing tortilla chips are commercially successful, they lack substantial nutritional value. The corn flavor of some corn chip products is disguised by heavy application of seasonings. Moreover, many commercial corn chips lack substantial texture.

It is therefore an object of the present invention to provide tortilla chips having improved, intensified flavor and natural sweetness without resorting to added seasonings, and enhanced nutritional values.

SUMMARY OF THE INVENTION

Tortilla chips having improved flavor and textural characteristics, as well as enhanced nutritional values, are provided according to the present invention using a combination of whole kernel dried grain, e.g. corn, and germinated grain to produce a masa dough. Germinated corn contributes a "sweet" flavor as a consequence of the high concentration of natural sugars in the sprouted material. The sprouted corn also contributes fiber content that provides products having a desirable texture, and it contributes substantial nutritional values to the products. Specialized methods and apparatus for processing masa dough comprising germinated grain are required as a consequence of the unique consistency and higher fiber content of the masa dough mixture.

Masa dough is produced, according to the present invention, by cooking and steeping raw, dried, whole kernel corn in water and lime. The lime assists in the degradation of complex starches and facilitates release of the outer husk, or paracarb, of whole kernel corn. After a suitable steeping time has expired, the liquids are substantially drained from the cooked corn, and the corn kernels are rinsed with water and tumbled to release the paracarb and to separate residual starches from the surface of the kernel. Cooked corn is then mixed with raw, whole kernel germinated grain, preferably corn. The cooked and germinated grain mixture is ground to produce a dense masa dough.

Ground masa dough containing a combination of non-germinated and germinated corn is blended thoroughly and extruded before it is flattened in a sheeting apparatus and cut to provide desired dough shapes. Operation of the sheeting apparatus is adjusted to accommodate the high fiber content of the masa dough resulting from the addition of sprouted corn. The dough shapes are then baked to reduce their moisture level and equilibrated to maintain a uniform moisture content throughout the dough shape. The baked, equilibrated dough shapes are finally fried to produce tortilla chips, and the tortilla chips are inspected, seasoned and packaged.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which.

DESCRIPTION OF PREFERRED EMBODIMENTS

Products made according to the methods of the present invention include a whole grain or flour fraction and a germinated grain fraction. Whole kernel corn or corn flour provides the principal raw material for tortilla chips according to the present invention. The corn is preferably organically grown, and is most preferably three year certified organically grown corn. Yellow and/or blue and/or white corn may be used, depending upon the desired color characteristics of the final product. Whole kernel corn is dried and cleaned prior to processing, and it preferably has a moisture content of about 5% to about 25%, and most preferably about 12% to about 14%. The same type of raw, dried, whole kernel corn may be used both for the cooked corn fraction and the germinated corn fraction.

Figure 1:
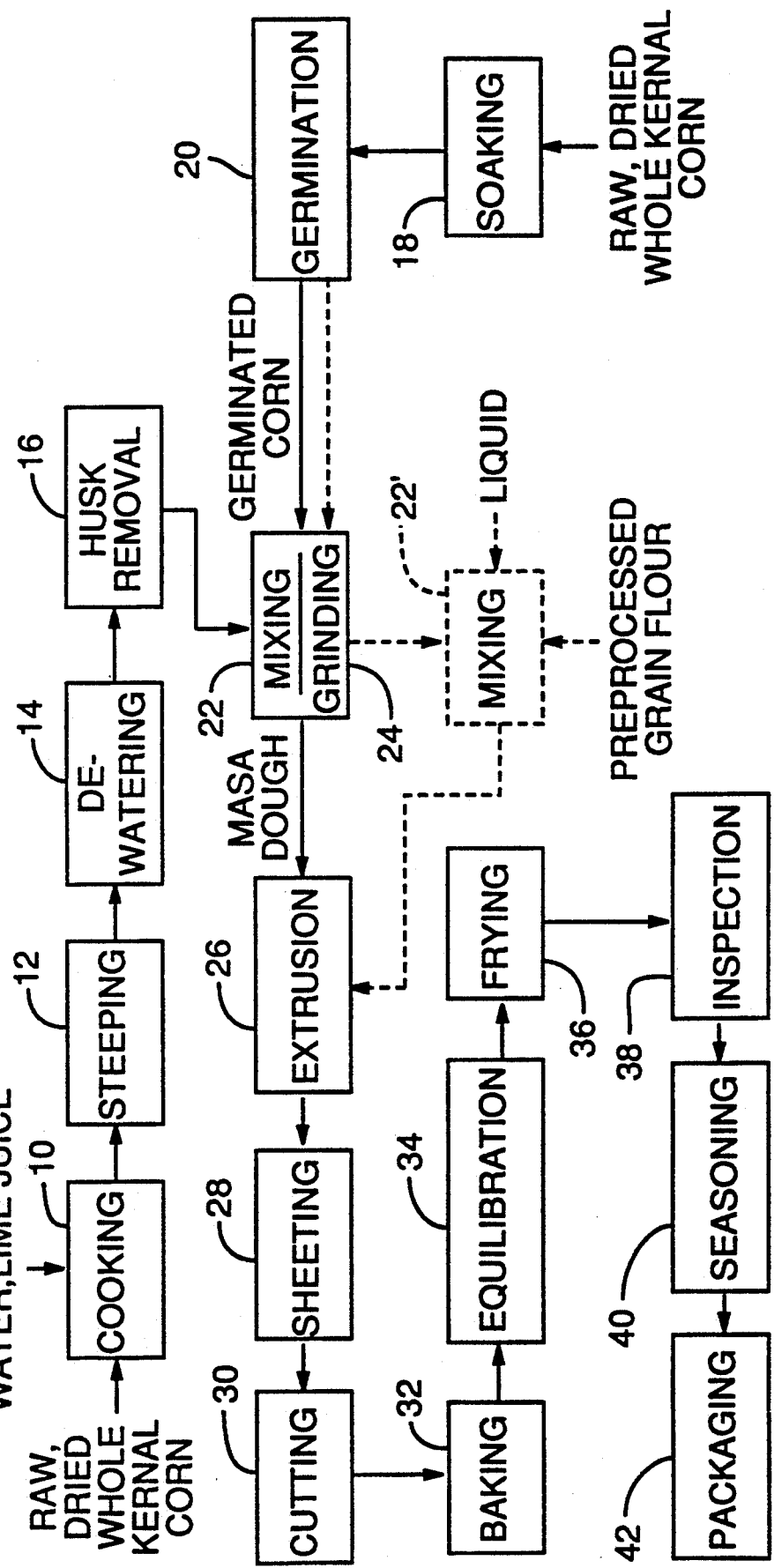
FIG. 1 shows a schematic flow diagram illustrating various stages involved in the production of tortilla chips according to methods of the present invention.

The methodology of the present invention is shown schematically in the flow diagram of FIG. 1. The processing stages illustrated in FIG. 1 will be briefly described below, and specific processing stages will be described in more detail in the material that follows. As shown, raw, whole kernel corn is mixed with water and lime and cooked at cooking stage 10. Cooked corn is then steeped in steeping stage 12 and drained in dewatering stage 14. The cooking, steeping and dewatering stages may be combined in a single operation. Cooked, dewatered corn next undergoes rinsing and husk removal, if necessary, at husk removal stage 16.

While whole kernel corn is cooked, steeped, dewatered and husked, another batch of raw, whole kernel corn is soaked in soaking stage 18 and germinated in germinating stage 20. Raw, whole kernel germinated corn is mixed with whole kernel, cooked, husked corn in mixing stage 22, and the corn mixture is ground in grinding stage 24 to form a masa dough. The masa dough is extruded in extruding stage 26, formed into dough sheets in sheeting stage 28, and cut into desired dough shapes at cutting stage 30. The dough shapes are subsequently baked in baking stage 32, equilibrated in equilibrator 34, and fried in fryer 36 to produce tortilla chips. Tortilla chips are finally inspected, seasoned, and packaged at stations 38, 40 and 42, respectively. Although each process stage is illustrated separately in FIG. 1 for purposes of clarity, many of the process stages may be consolidated in industrial scale production.

Although cooking, steeping, dewatering and husk removal stages of whole grain corn processing are preferred, many of the benefits of the present invention may be achieved using pre-processed grain flours. Thus, for example, as illustrated in dashed lines in FIG. 1, germinated corn may be ground in grinding stage 24 and conveyed to a mixing stage 22', where it is mixed with preprocessed grain flour and liquid to form a masa dough. The masa dough may then be processed, as described above, to produce corn chips.

In cooking stage 10, raw, whole kernel corn is submerged in water and cooked at about 180° F. for about 90 minutes. Powdered lime is preferably added to the corn and water mixture at a concentration of about one percent (1%) by weight, of the raw, whole kernel corn. The cooking vessel is preferably a large stainless steel tank that can be heated by gas-fired or other types of burners, a steam jacket, or by steam injection. Preferred corn cooking methods utilize an uncovered vessel heated by gas burners to boil the corn/liquid mixture for the requisite time period. The cooked corn/liquid mixture is then steeped for a time interval of at least about four hours, and preferably about eight hours. After steeping, the cooking liquid is withdrawn from the cooked corn. The moisture content of the cooked, whole kernel corn at this stage is desirably about 40% to about 60%, and most preferably about 47% to 52%.

After the whole kernel corn has been cooked, steeped, and dewatered, it is rinsed and treated to remove the outer husk, or paracarb. A preferred methodology involves processing the cooked corn kernels in a horizontal tumbling cylinder where high pressure cold water is sprayed onto the corn kernels as they are tumbled. This process releases the paracarb, and it additionally separates undesired residual starches from the surface of the exposed corn kernels.

Tortilla chips produced by processing masa dough according to the present invention contain a germinated grain fraction in addition to the cooked, whole kernel corn fraction. The germinated grain fraction preferably comprises corn, but other sprouted grains, beans, rice, or similar materials may be used alone or in combination with germinated corn. Various methods for germinating grains, rice, beans and the like are known in the art and would be suitable for producing germinated material having the characteristics described below. Preferred methodologies for germinating corn have, however, been developed. Raw, dried whole corn kernels of the same type and quality that are cooked, as described above, are loaded in a stainless steel vessel. Up to 250 pounds of raw, whole kernel corn forming a layer about 8 to 20 inches deep may be sprouted in a single batch operation in an open sprouting vessel. The bottom of the vessel has a perforated stainless steel screen that permits air and liquid flow through the loaded vessel.

A batch of raw, dried, whole kernel corn is soaked in tap water having an initial temperature of about 100° F. for about 16 to 30 hours, and preferably for about 24 hours. Thereafter, the vessel is drained and soaked corn is rinsed with cool water. The temperature of the environment is controlled to maintain constant germination temperatures of about 70° F. to 78° F., and most preferably about 74° F. The corn is thoroughly rinsed with water periodically to promote germination. Periodic rinsing at twelve-hour intervals is generally preferred. The desired germination stage is achieved under these conditions in about 2 to 3 days, preferably about 2½ days. Desired germination properties include a root extending from the kernel for about ⅛ inch, and a "nib" of about ⅛ inch in length put out by the kernel. Germinated corn preferably has a moisture content of about 40% to 60%, with moisture contents of about 50% to 52% being especially preferred. The husks are not removed from germinated corn.

Raw, germinated corn is conveyed, for example, using a vibratory conveyer, and mixed with cooked, dewatered whole kernel corn at mixing stage 22 to form a corn mixture. Sprouted corn is preferably mixed with cooked whole kernel corn to achieve mixture compositions having about 2% to about 25% germinated corn, with corn mixtures comprising about 10% germinated corn being effective to produce corn chips having enhanced flavor, texture and nutritional values.

The corn mixture is then ground using a high precision corn grinder to form a masa dough. Fine adjustment control is required as a consequence of the higher fiber content of the germinated material. Mechanized corn grinders typically supply corn to a grinder hopper using an auger and metering gate. Corn is drawn between the grinding stones, and ground corn or masa is discharged vertically below. High capacity, high precision grinders operated by 75 horsepower motors and having grinding stone diameters of at least about 10 inches, and preferably eighteen inches, are preferred. Such grinders are commercially available.

The cooked and sprouted corn mixture is processed in a corn grinder of the type described set at a coarseness setting of about 15 to about 25, and preferably about 20. Grinding produces masa dough that is very dense and has a slightly fibrous feel to it when rubbed between the fingers. The preferred moisture content of the masa dough at this stage of processing is about 40% to about 60%, with a moisture content of about 48% to 50% being especially preferred. Water may be added during the grinding process to achieve the desired masa dough consistency and moisture content, if necessary.

Masa dough is mixed thoroughly to produce a dense, cohesive dough. After thorough mixing, the dough is extruded through two openings, each having relatively small dimensions, preferably on the order of about ½ inch by 3 inches to promote cohesion and prepare the dough for the sheeting stage.

After the masa dough is extruded, a thin sheet of dough is produced by passing the dough between a plurality of cylinders, or rollers, in a sheeting apparatus. The sheeting apparatus generally includes a cutting means that cuts the dough sheets into desired shapes. The function of the sheeting apparatus is to flatten the masa dough to provide a thin layer of dough having a desired and generally uniform thickness. The desired thickness depends upon the desired final configuration of the corn product. For corn tortilla chips, for example, a sheeted, cut shape weight of about 48 to about 53 grams/10 pieces is suitable.

Figure 2:
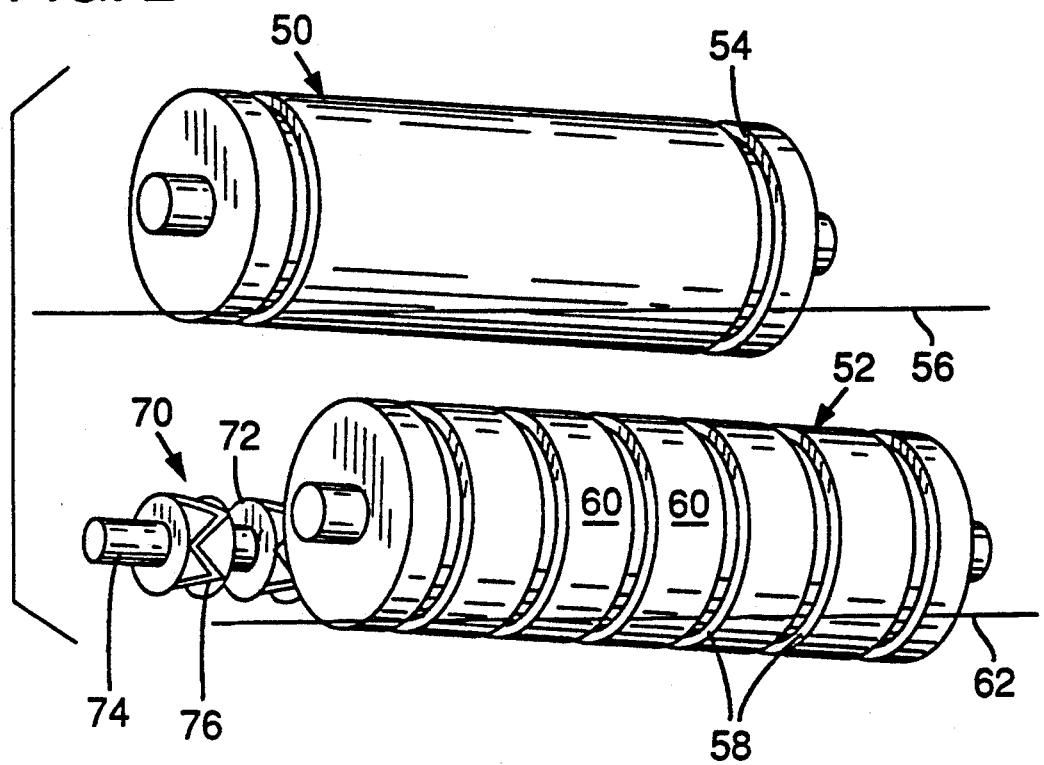
FIG. 2 shows a schematic plan view of opposed rollers forming a part of the sheeting apparatus for forming masa dough into sheets of substantially uniform thickness.
Figure 3:
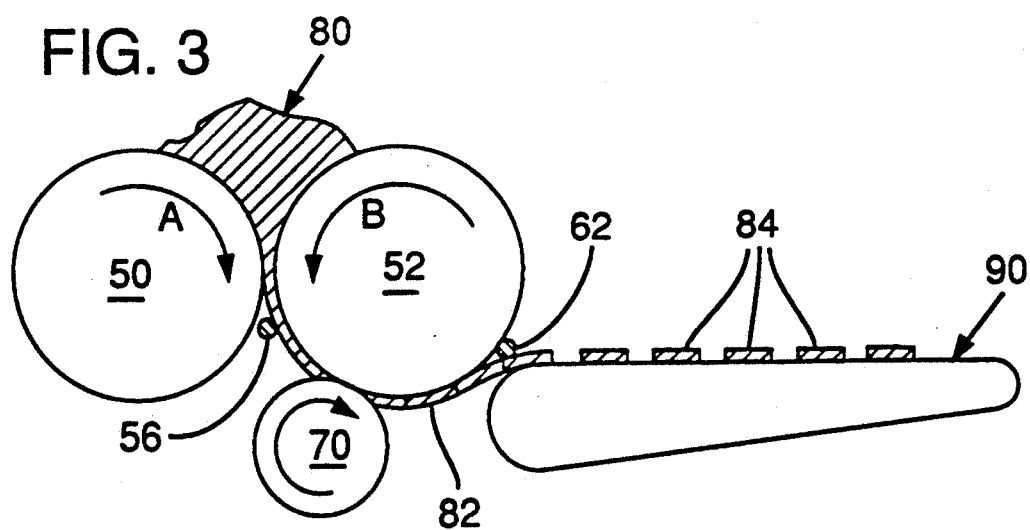
FIG. 3 shows a schematic side view, partially in cross section, of masa dough being sheeted and cut in a sheeting apparatus described herein.

An exemplary sheeting and cutting apparatus is illustrated in FIGS. 2 and 3. As shown, two rollers, first roller 50 and second roller 52, have substantially the same diameter and are aligned on generally parallel longitudinal axes. In operation, their closest outer surfaces are spaced from one another a distance that corresponds to the desired sheet thickness.

As shown in FIG. 2, first roller 50 has a generally smooth surface with annular grooves 54 in proximity to each end. A tightly fitting band comprising brass, nylon, or the like, is located in each groove. Additionally, at lease one thin metallic wire 56 is arranged contacting the smooth surface of the roller and is passed underneath the bands in grooves 40. Wire 56 is slightly skewed with respect to the longitudinal roller axis. The smooth outer surface of first roller 50 is preferably slightly convex.

Second roller 52 serves a cutting as well as a flattening function and has several annular grooves 58 that serve to cut the flattened masa dough into longitudinal strips. Each set of two neighboring grooves defines a dough strip surface 60. Each of the grooves has a tightly fitting brass band, and a thin metallic wire 62 arranged contacting the smooth surface of the roller and is passed underneath the bands in grooves 58. Wire 62 is preferably slightly skewed with respect to the longitudinal roller axis. The smooth outer surface of second roller 52 is preferably slightly concave.

As shown in FIG. 2, cutter assembly 70 is provided in conjunction with the sheeting rollers 50 and 52. Cutter assembly 70 comprises a plurality of cylindrical cutting units 72 mounted on a spindle 74 aligned on a longitudinal axis generally parallel to the longitudinal axes of first and second rollers 50 and 52, respectively. Cutting units 72 are sized and spaced to contact the strips of dough cut by second roller 52. The number and spacing of cutting units thus corresponds to the number and spacing of dough strip surfaces 60 defined by grooves 58 in second roller 52. Each cutting unit has a plurality of cutting edges 76 capable of cutting the strips of masa dough formed on dough strip surfaces 60 to provide desired dough shapes. In the embodiment illustrated in FIG. 2, cutting units 72 provide triangular dough shapes.

Operation of the sheeting and cutting apparatus is illustrated in FIG. 3. Extruded masa dough 80 is fed to the top of the sheeting apparatus between first and second rollers 50 and 52. Containment barriers are preferably erected extending upwardly from and generally perpendicularly to the end surfaces of the rollers. As first and second rollers 50 and 52, respectively, are rotated in opposite directions indicated by arrows A and B, a masa dough sheet 82 having a substantially uniform thickness is produced. According to especially preferred embodiments, first roller 50 may be rotated at a slightly higher rate of rotation than second roller 52. This differential in the rates of rotation facilitates sheeting of high fiber content masa dough.

Sheeted masa dough 82 exiting the flattening area between first and second rollers 50 and 52, respectively, is retained on the surface of second roller 52 and is conveyed to a cutting area at cutting assembly 70 upon further rotation of second roller 52. Rotary cutter 70 is located so that the outer surfaces of cutting edges 76 lightly contact the outer surface of second roller 52 to accomplish cutting of the masa dough sheet into desired dough shapes. As shown, rotary cutter 70 is rotated in the opposite direction from the rotation of second roller 52. Dough shapes are cut by cutting edges 76, but the cut dough is retained on the surface of second roller 52 until it is released with the assistance of wire 62. Rotatable discharge belt 90 is positioned and operated to collect and convey the dough shapes.

Stationary wires 56 and 62 mounted underneath the bands on first and second rollers 50 and 52, respectively, remain stationary during rotation of the rollers. Wire 56 is positioned immediately below the dough sheeting area and assists to release masa dough sheet 82 from first roller 50. Additionally, it cleans the surface of roller 50 to prepare it for additional dough flattening rotations. Wire 62 is positioned adjacent a discharge conveyor belt 90 and assists to release dough shapes 84 from second roller 52 and deposit them on discharge conveyor belt 90. Additionally, it cleans the roller surface to prepare it for additional dough flattening. Additional stationary wires may be provided contacting rollers 50 and 52 to assist dough release and roller cleaning functions.

Dough shapes are conveyed from the sheeting and cutting stage to an oven for baking. Preferred ovens have a system of conductive, metallic conveyors that transport dough shapes in a substantially single thickness layer through various baking zones. According to preferred embodiments of the present invention, masa dough shapes are preferably baked for about 8 to 30 seconds, and most preferably for about 12 to 18 seconds, at a temperature of about 750° F. As a consequence of the baking operation, the moisture content of the dough shapes is reduced to about 37%.

Baked dough shapes are conveyed to an equilibrator that cools the baked dough shapes in a manner that equalizes the moisture content throughout the shape. Equilibration of the baked dough shapes permits more even frying and oil absorption during the subsequent frying operation. Various types of equilibrators are available and may be employed in the methods and systems of the present invention. In general, equilibrators comprise a conveyorized system that makes multiple passes through one or more cooling zones. The equilibration process generally takes about 10 to 15 minutes.

Equilibrated dough shapes are then fried in an oleic medium. Various apparatus may be employed to accomplish the frying operation. Conveyorized fryers are preferred for most applications. Preferred oils have a low saturated fat content. High oleic safflower oil is especially preferred because it has a low saturated fat content. Other oils would, of course, be suitable.

Desired frying temperatures vary, of course, depending upon the composition of the oil used. Frying temperatures of about 360° F. are preferred when high oleic safflower oils are used for frying. Residence times vary depending upon the type and temperature of the oil. Short residence times of about 2 minutes are preferred when high oleic safflower oils are used at frying temperatures of about 360° F. The fried dough shapes, which now resemble tortilla chips, preferably have a moisture content of about 0.5% to about 5%, and most preferably about 1.2% to 1.5%. The frying operation preferably results in an oil absorption of about 15% to about 30%, and most preferably about 20% to about 22% oil, by weight, in the final tortilla chip.

Fried tortilla chips are inspected, and broken, burned or misshapen shapes are discarded. The fried tortilla chips are then seasoned by processing in a rotating tumbler that dispenses seasoning agents such as salt. Salt is preferably dispensed onto the tortilla chips at a level of about 1.7%, by weight, to produce a lightly salted product. Finally, the fried tortilla chips are weighed and packaged.

Although the methods, systems and products of the present invention have been described with reference to corn masa dough, the invention is not limited to products composed entirely of corn. Other grains and flours may be introduced, as desired, to provide flavor, nutritional values, fiber, or other qualities. Moreover, the germinated fraction may comprise corn, as well as other grains, beans, rice, or the like.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A method for making tortilla chips, comprising:
   mixing a raw, germinated grain fraction with a non-germinated grain fraction to produce a grain mixture;
   grinding the grain mixture to produce a dense dough;
   sheeting the dough to form a dough sheet;
   cutting the dough sheet to provide desired dough shapes; and
   heating the dough shapes to produce tortilla chips.

2. A method for making tortilla chips according to claim 1, wherein the raw, germinated grain fraction comprises raw, germinated whole kernel corn, and the non-germinated grain fraction comprises non-germinated corn.

3. A method for making tortilla chips according to claim 1, wherein the raw, germinated grain fraction comprises about 2% to about 25% of the grain mixture.

4. A method for making tortilla chips according to claim 1, wherein the dense dough produced by grinding the grain mixture has a moisture content of about 48% to 50%.

5. A method for making tortilla chips according to claim 1, additionally comprising germinating a raw grain by soaking dried, whole grain in a liquid for a soaking period, draining the soaked grain, and periodically rinsing the soaked grain and maintaining it in a constant temperature environment for a germination period.

6. A method for making tortilla chips according to claim 1, wherein the raw, germinated grain fraction comprises whole kernel corn having a root of about one-half inch in length and a nib of about one-half inch in length.

7. A method for making tortilla chips according to claim 1, wherein the raw, germinated grain fraction comprises germinated corn having a moisture content of about 50% to about 52%.

8. A method for making tortilla chips according to claim 1, additionally comprising preparing a non-germinated grain fraction for mixing with the raw, germinated grain fraction by cooking and steeping raw, dried whole grain in a liquid, draining cooked and steeped whole grain, and rinsing and removing the husks of the cooked, steeped whole grain.

9. A method for making tortilla chips according to claim 8, wherein the raw, dried whole grain is whole kernel corn.

10. A method for making tortilla chips according to claim 9, wherein raw, dried whole kernel corn is cooked in a liquid comprising water and about 1% lime, by weight of the dry weight of corn, at about 180° F. for about 90 minutes.

11. A method for making tortilla chips according to claim 1, additionally comprising removing husks from the non-germinated grain fraction prior to grinding.

12. A method for making tortilla chips according to claim 1, additionally comprising baking the dough shapes to produce baked dough shapes, equilibrating baked dough shapes to equalize the moisture content throughout the baked dough shapes, and frying the baked, equilibrated dough shapes.

13. A method for making tortilla chips according to claim 12, wherein the baked dough shapes have a moisture content of about 30% to 45%.

14. A method for making tortilla chips according to claim 12, wherein the dough shapes are baked at a temperature of 750° F. for about 8 to 30 seconds.

15. A method for making tortilla chips according to claim 12, comprising frying the baked, equilibrated dough shapes in a high oleic safflower oil.

16. A method for making tortilla chips according to claim 12, comprising frying the baked, equilibrated dough shapes in high oleic safflower oil at a temperature of about 360° F. for about two minutes.

17. A tortilla chip produced according to the method of claim 1.

18. A method for making tortilla chips, comprising:
   mixing a raw, germinated grain fraction with a grain flour and a liquid to produce a dense dough;
   sheeting the dough to form a dough sheet;
   cutting the dough sheet to provide desired dough shapes; and
   heating the dough shapes to produce tortilla chips.

19. A tortilla chip comprising a fraction derived from a raw, germinated corn and a non-germinated corn fraction.

20. A tortilla chip comprising a fraction derived from germinated, whole kernel corn and a non-germinated corn fraction.

21. A snack food product comprising a fraction derived from raw, germinated grain and a non-germinated grain fraction.

22. A snack food product comprising a fraction derived from germinated, whole grain and a non-germinated grain fraction.

23. A method for making tortilla chips, comprising:
   mixing a germinated, whole grain fraction with a non-germinated grain fraction to produce a grain mixture;
   grinding the grain mixture to produce a dense dough;
   sheeting the dough to form a dough sheet; cutting the dough sheet to provide desired dough shapes; and
   heating the dough shapes to produce tortilla chips.

24. A method for making tortilla chips, comprising:
   mixing a germinated, whole grain fraction with a grain flour and a liquid to produce a dense dough;
   sheeting the dough to form a dough sheet; cutting the dough sheet to provide desired dough shapes; and
   heating the dough shapes to produce tortilla chips.

25. A method for making a processed grain product, comprising:

mixing a raw, germinated, whole grain fraction with a non-germinated grain fraction to produce a grain mixture;
grinding the grain mixture to produce a dense dough;
sheeting the dough to form a dough sheet;
cutting the dough sheet to provide desired dough shapes; and
heating the dough shapes to produce a processed grain product.

26. A method for making a processed grain product, comprising:
mixing a raw, germinated, whole grain fraction with a grain flour and a liquid to produce a dense dough;
sheeting the dough to form a dough sheet; cutting the dough sheet to provide desired dough shapes; and
heating the dough shapes to produce a processed grain product.

* * * * *